US009182917B1

(12) United States Patent
Wu et al.

(10) Patent No.: US 9,182,917 B1
(45) Date of Patent: Nov. 10, 2015

(54) STORAGE SYSTEM POLLING REDUCTION

(71) Applicant: EMC Corporation, Hopkinton, MA (US)

(72) Inventors: Rongzhang Wu, Shanghai (CN); Xiao Hua Fan, Shanghai (CN); Yuanjie Wu, Shanghai (CN); Feng Yin, Sichuan (CN); Hui Gao, Shanghai (CN); Brian Robideau, Bellingham, MA (US)

(73) Assignee: EMC Corporation, Hopkinton, MA (US)

( * ) Notice: Subject to any disclaimer, the term of this patent is extended or adjusted under 35 U.S.C. 154(b) by 122 days.

(21) Appl. No.: 14/149,609

(22) Filed: Jan. 7, 2014

(51) Int. Cl.
*G06F 12/02* (2006.01)
*G06F 3/06* (2006.01)

(52) U.S. Cl.
CPC ............ *G06F 3/0617* (2013.01); *G06F 3/0632* (2013.01); *G06F 3/0689* (2013.01)

(58) Field of Classification Search
CPC .... G06F 3/0617; G06F 3/0632; G06F 3/0689
See application file for complete search history.

(56) References Cited

U.S. PATENT DOCUMENTS

| 7,409,497 | B1 * | 8/2008 | Kazar et al. ................... 711/114 |
| 7,945,756 | B1 * | 5/2011 | Britton et al. ................. 711/170 |
| 8,112,489 | B1 * | 2/2012 | Cox et al. ...................... 709/208 |
| 8,234,380 | B1 * | 7/2012 | Tetreault et al. .............. 709/226 |
| 8,856,079 | B1 * | 10/2014 | Subramanian et al. ....... 707/649 |
| 9,003,043 | B1 * | 4/2015 | Moranta et al. ............... 709/227 |
| 2009/0119564 | A1 * | 5/2009 | Sagfors et al. ................ 714/748 |

* cited by examiner

*Primary Examiner* — Hiep Nguyen
(74) *Attorney, Agent, or Firm* — Proskauer Rose LLP

(57) ABSTRACT

Described are methods, systems, and apparatus for reducing storage system polling when collecting and providing storage system state data. A plurality of poll requests for storage system state data is received. For each poll request of the plurality of poll requests, a poll request arrival time associated with the poll request is stored. A first poll is initiated to collect first storage system state data for a first poll request of the plurality of poll requests. A first poll start time associated with the first poll is stored. The first poll is completed, forming the first storage system state data. For each poll request of the plurality of poll requests, the first storage system state data is provided for the poll request provided that the poll request arrival time is before the first poll start time.

17 Claims, 6 Drawing Sheets

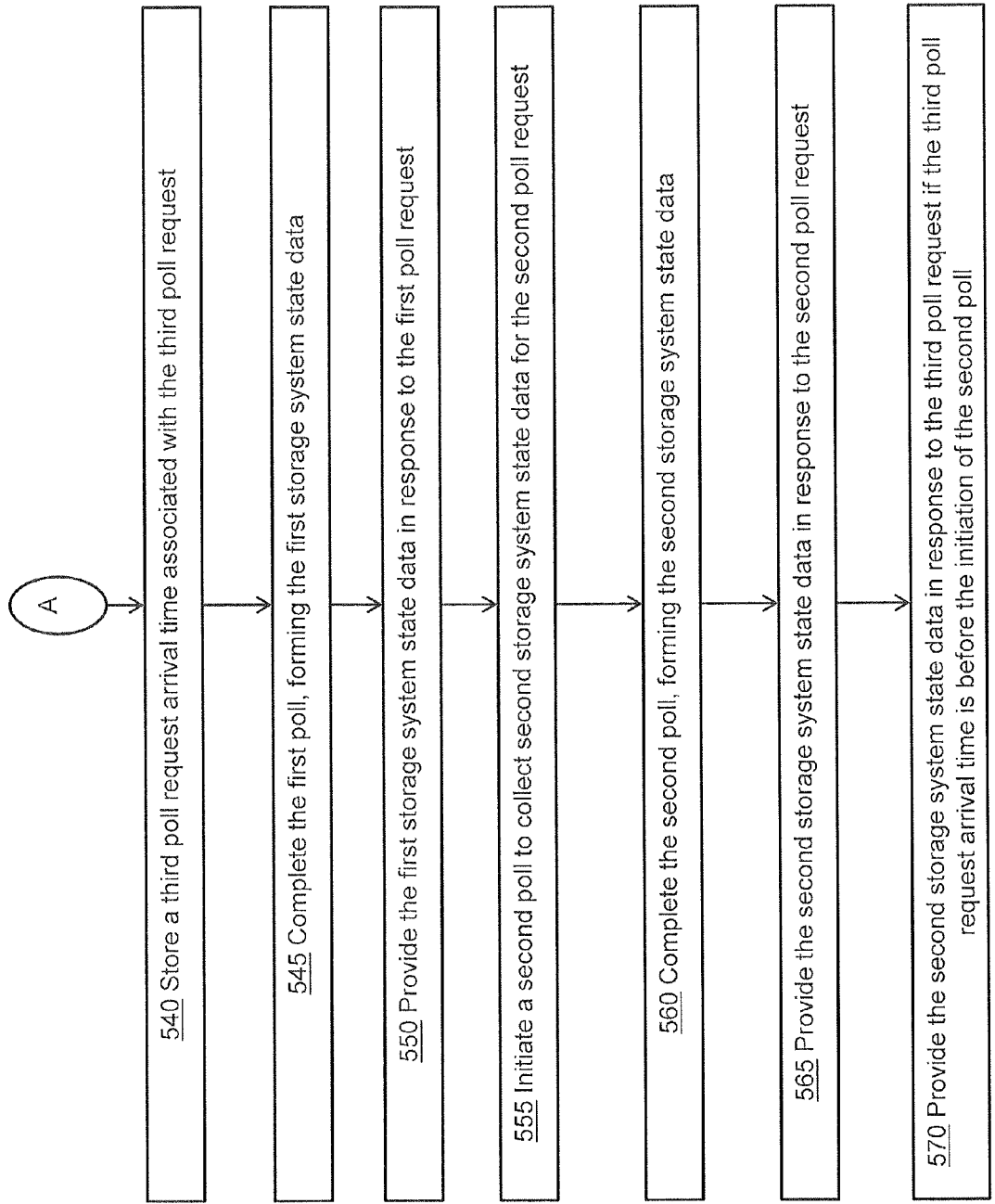

STORAGE SYSTEM POLLING REDUCTION

TECHNOLOGICAL FIELD

The present technology relates generally to storage systems and, more specifically, to reducing storage system polling when collecting and providing storage system state data.

BACKGROUND

In some applications, a storage system can provide storage system state data in response to requests from consumers of such storage system state data. For example, an administrator can request storage system state data from a storage system through a storage system management application interface to obtain information about the storage system operation. As another example, a user can request storage system state data from the storage system through a web-based interface to obtain information about his or her storage utilization. As still another example, a program can request storage system state data through an API made available by the storage system.

When multiple consumers request storage system state data from a storage system, the consumers can experience degraded performance (e.g, delays in receiving current system state data) due to the delay from the storage system handling the multiple requests.

SUMMARY

Accordingly, there is a need to efficiently obtain storage system state data from storage systems.

In an aspect, there is a method performed by a storage system. The method includes receiving, by the storage system, a plurality of poll requests for storage system state data. The method includes, for each poll request of the plurality of poll requests, storing, by the storage system, a poll request arrival time associated with the poll request. The method includes initiating, by the storage system, a first poll to collect first storage system state data for a first poll request of the plurality of poll requests. The method includes storing, by the storage system, a first poll start time associated with the first poll. The method includes completing, by the storage system, the first poll, forming the first storage system state data. The method includes, for each poll request of the plurality of poll requests, providing, by the storage system, the first storage system state data for the poll request provided that the poll request arrival time is before the first poll start time.

In some embodiments, the first storage system state data includes at least one of storage system status, storage system name, storage system model, storage system IP address, storage system serial number, storage system storage capacity, storage pool capacity, storage pool and utilization, RAID group capacity, RAID group utilization, LUN status, a number of disks in the storage system, hosts connected to the storage system, mirroring configuration, and replication configuration.

In some embodiments, the method includes receiving, by the storage system, from a client device, a first poll request of the plurality of the poll requests via a network. In some embodiments, the method includes storing the first storage system state data in a cache of the storage system. In some embodiments, providing, by the storage system, the first storage system state data for the poll request provided that the poll request arrival time is before the first poll start time includes providing the first storage system state data from the cache. In some embodiments, the method includes initiating, by the storage system, a second poll for storage system state data for a second poll request of the plurality of poll requests, wherein the poll request arrival time of the second poll request is after the first poll start time. In some embodiments, the method includes storing, by the storage system, a second poll start time associated with the second poll. In some embodiments, the method includes completing, by the storage system, the second poll, forming second storage system state data. In some embodiments, the method includes, for each poll request of the plurality of poll requests where the poll request arrival time is after the first poll start time, providing, by the storage system, the second storage system state data for the poll request provided that the poll request arrival time is before the second poll start time.

In another aspect, there is a storage system. The storage system includes a management module configured to receive a plurality of poll requests for storage system state data. The storage system includes a poll manager module configured to, for each poll request of the plurality of poll requests, store a poll request arrival time associated with the poll request; initiate a first poll to collect first storage system state data for a first poll request of the plurality of poll requests; and store a first poll start time associated with the first poll. The storage system includes an administrative module configured to complete the first poll, forming the first storage system state data. In some embodiments, the poll manager is further configured to, for each poll request of the plurality of poll requests, provide the first storage system state data for the poll request provided that the poll request arrival time is before the first poll start time.

In some embodiments, the first storage system data includes at least one of storage system status, storage system name, storage system model, storage system IP address, storage system serial number, storage system storage capacity, storage pool capacity, storage pool and utilization, RAID group capacity, RAID group utilization, LUN status, a number of disks in the storage system, hosts connected to the storage system, mirroring configuration, and replication configuration. In some embodiments, the management module is further configured to receive, from a client device, a first poll request of the plurality of the poll requests via a network. In some embodiments, the administration module is further configured to store the first storage system state data in a cache of the storage system. In some embodiments, the management module is further configured to provide the first storage system state data from the cache. In some embodiments, the poll manager is further configured to initiate a second poll to collect second storage system state data for a second poll request of the plurality of poll requests, wherein the poll request arrival time of the second poll request is after the first poll start time; and store a second poll start time associated with the second poll. In some embodiments, the administrative module is further configured to complete the second poll, forming second storage system state data. In some embodiments, the poll manager is further configured to, for each poll request of the plurality of poll requests where the poll request arrival time is after the first poll start time, provide the second storage system state data for the poll request provided that the poll request arrival time is before the second poll start time.

In another aspect, there is a method. The method includes receiving, by the storage system, a first poll request for storage system state data. The method includes storing, by the storage system, a first poll request arrival time associated with the first poll request. The method includes initiating, by the storage system, a first poll to collect first storage system state data for the first poll request. The method includes receiving, by the storage system, after initiating the first poll, a second poll request for storage system state data. The method includes storing, by the storage system, a second poll request arrival time associated with the second poll request. The method includes receiving, by the storage system, after initiating the first poll, a third poll request for storage system state data. The method includes storing, by the storage system, a third poll request arrival time associated with the third poll request. The method includes completing, by the storage system, the first poll, forming the first storage system state data. The method includes providing, by the storage system, the first storage system state data in response to the first poll request. The method includes initiating, by the storage system, a second poll to collect second storage system state data for the second poll request. The method includes completing, by the storage system, the second poll, forming the second storage system state data. The method includes providing, by the storage system, the second storage system state data in response to the second poll request. The method includes providing, by the storage system, the second storage system state data in response to the third poll request if the third poll request arrival time is before the initiation of the second poll.

In some embodiments, the first storage system data includes at least one of storage system status, storage system name, storage system model, storage system IP address, storage system serial number, storage system storage capacity, storage pool capacity, storage pool and utilization, RAID group capacity, RAID group utilization, LUN status, a number of disks in the storage system, hosts connected to the storage system, mirroring configuration, and replication configuration.

In some embodiments, the method includes receiving, by the storage system, from a client device, the first poll request via a network. In some embodiments, the method includes storing the first storage system state data in a cache of the storage system. In some embodiments, the method includes if the third poll request arrival time is after the initiation of the second poll: initiating, by the storage system, a third poll to collect third storage system state data for the third poll request; completing, by the storage system, the third poll, forming the third storage system state data; and providing, by the storage system, the third storage system state data in response to the third poll request.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which:

FIGS. 5A and 5B are a flow chart illustrating a method in accordance with the technology.

DETAILED DESCRIPTION

The technology relates to collecting and providing storage system state data. In some applications of the technology, the technology can facilitate a storage system providing storage system state data in response to requests from consumers of such storage system state data. In response to receiving a request for storage system state data, a storage system can poll its constituent hardware and logical aspects to collect information about its state. Storage system state data can be any information related to the operation and/or configuration of the storage system. Storage system state data can include logical information and physical information about the storage system. For example, storage system state data can include any of the following: system status, system name, system model, system IP addresses, system serial number, system storage capacity, storage pool capacity and utilization, RAID group capacity and utilization, storage status, including information about the status of the logical units (LUNs), number of disks in the system, status information for disks in the system, information about the hosts connected to the storage system, and mirroring and replication configuration and status. Once the storage system completes polling to collect its state information, the collected state information can be provided to the requesting consumer of the storage system state information.

In some storage systems, polling is single threaded (e.g., one system poll can occur at a time, and requests are serviced sequentially). As storage systems increase in complexity and size, e.g., in terms of physical configuration (e.g., number of disks, disk enclosures, etc.) and logical configuration (e.g., LUN's, storage pools, mirroring, etc.), the amount of time required to poll the storage system to collect the storage system state data can increase. As a result, consumers of storage system state data can experience delays in the response to their requests while previous requests for storage system state are processed (e.g., while the system performs polling to collect state data to respond to the earlier requests).

In some embodiments, the technology can reduce the number of storage system polls performed to respond to requests for storage system state data. The technology can include tracking when each request for storage system state data is received. For example, when a poll collects an instance of storage system state data, the technology can involve supplying that instance of storage system state data in response to requests that were received before that poll started. Beneficially, by using data from a single system poll to respond to multiple requests, the technology can avoid performing a system poll for each request.

Figure 1:
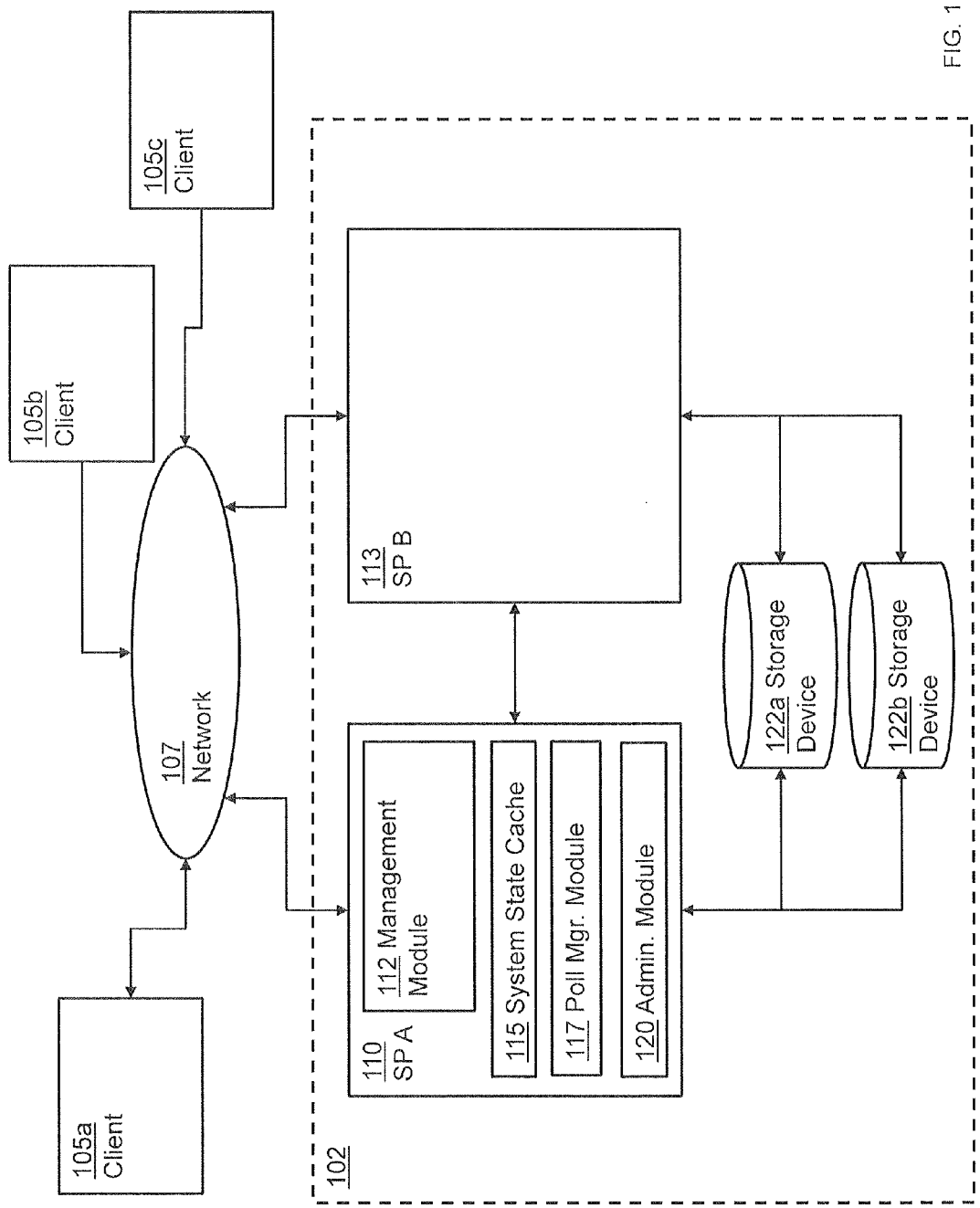
FIG. 1 depicts a storage system, clients, and a network in accordance with the technology.

FIG. 1 depicts storage system 102, clients 105, and network 107 in accordance with the technology. Storage system 102 and clients 105 are connected to and can communicate via network 107. Storage system 102 includes storage processor 110. Storage processor 110 can be a computing device. As illustrated, storage processor 110 includes management module 112, system state cache 115, poll manager module 117, and administrative module 120. In some embodiments, service processor 113 can have a configuration similar to service processor 110 (e.g., including a management module, system state cache, poll manager module, and administrative module (not sown)).

Management module 112, system state cache 115, poll manager module 117, and administrative module 120 can be software components, hardware components, or any combination thereof. Although management module 112, system state cache 115, poll manager module 117, and administrative module 120 are illustrated as separate components, it should be understood that the technology can be implemented using other module configurations. Clients 105 can be computing devices, such as PCs running storage system management software. Clients 105 can be any computing device that requests storage system state data. Storage system 102 includes storage devices 122. Storage devices 122 can be, for example, disks, disk enclosures, etc.

Figure 2:
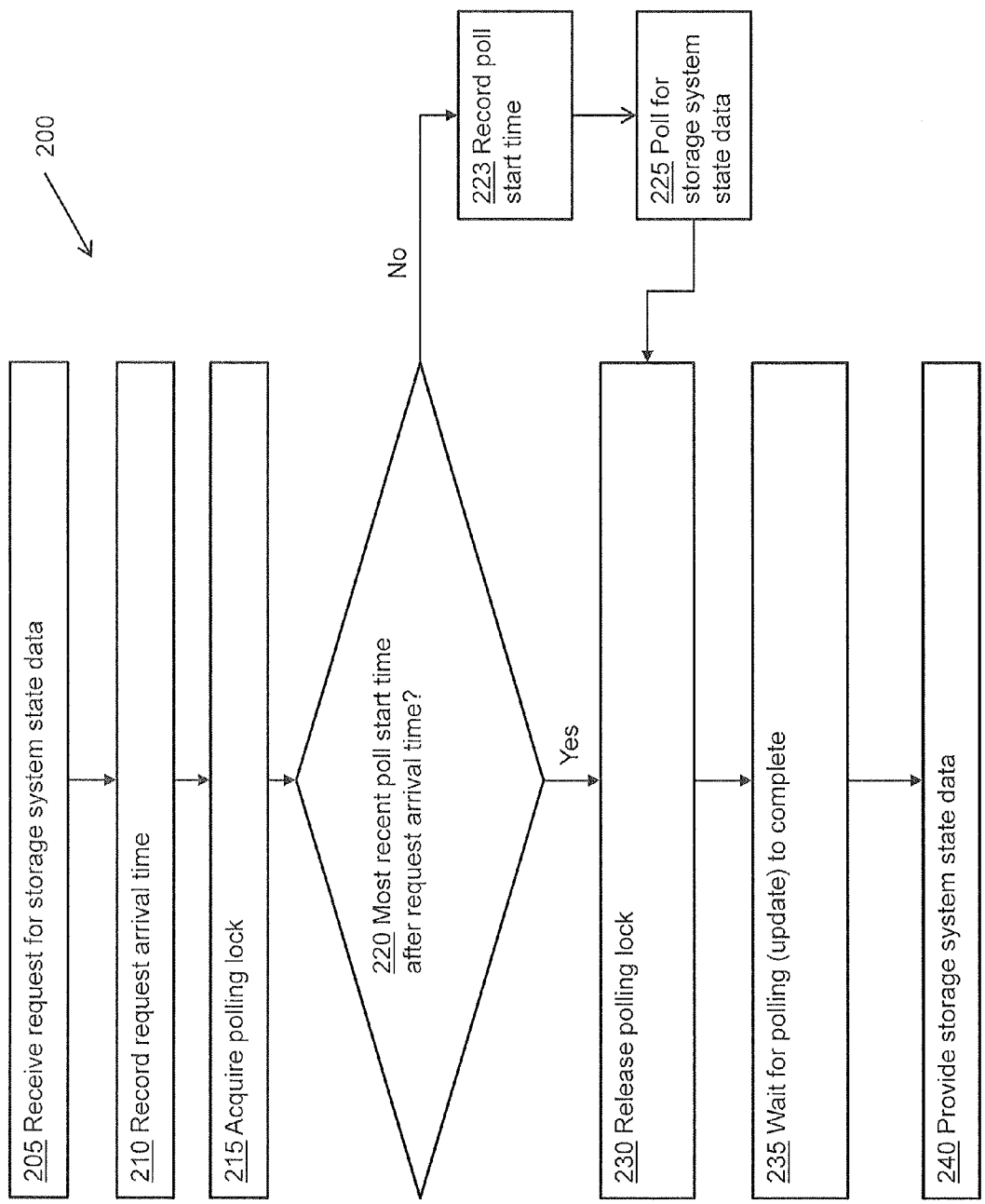
FIG. 2 is a flow chart illustrating a method in accordance with the technology.

FIG. 2 is flow chart 200 illustrating a method in accordance with the technology. For example, storage system 102 from FIG. 1 can perform the method illustrated in flow chart 200. In some embodiments, the illustrated method can be performed by a storage system for each request for storage system state data.

At step 205, a request for storage system state data is received. For example, with reference to FIG. 1, management module 112 can receive a request for storage system state data from client 105a.

At step 210, the arrival time of the request is recorded. For example, management module 112 can provide the request to poll manager module 117. Poll manager module 117 can record the arrival time of the request. In some embodiments, the request arrival time is stored in a variable of an object representing the request. In some embodiments, the arrival time is associated with the request (e.g., in a table or other data structure). In some embodiments, the arrival time is expressed as a time of day. In some embodiments, the arrival time is expressed as an elapsed time (e.g., milliseconds) from a known point in time.

At step 215, the polling lock is acquired. For example, poll manager module 117 can acquire the polling lock. In some embodiments, the polling lock can only be held by one process/thread at a time to prevent other components of the storage system from polling at the same time. In some embodiments, the lock can be a synchronization primitive (e.g., a semaphore, mutex, etc.).

At step 220, it is determined if the most-recent and/or last poll start time is after the request arrival time. For example, a prior poll can be initiated in response to a previously-received request for storage system state data. In some embodiments, poll manager 117 can compare the request arrival time to the start time of the most recent poll (e.g., the time at which the most recent poll for storage system data started). If the most recent poll start time is after the request arrival time, a new poll is not performed for this request and the method proceeds to step 230. If the most recent poll start time is after the request arrival time, the storage system state data collected in the most recent poll can be stale and a new poll is performed. The method proceeds to step 223.

At step 223, the start time for a new poll is recorded. For example, poll manager module 117 can record the start time of the new poll. In some embodiments, the start time is stored in a variable of an object representing the poll. In some embodiments, the start time is associated with the poll (e.g., in a table or other data structure). In some embodiments, the poll start time is expressed as a time of day. In some embodiments, the poll start time is expressed as elapsed time (e.g., milliseconds) from a known point in time.

At step 225, the poll for storage system state data is initiated. For example, poll manager module 117 can initiate the poll. In some embodiments, poll manager 117 causes administrative module 120 to poll the storage system to collect storage system data. For example, administrative module 120 can collect logical and/or physical state data related to storage processors 110 and 113, and storage devices 122.

At step 230, the polling lock is released. For example, poll manager module 117 can release the poll lock. At step 235, the method waits for polling to complete. For example, poll manager module 117 can wait for polling to complete.

At step 240, the storage system state data is provided. For example, the storage system data can be provided to system state cache 115. In some embodiments, management module 112 can retrieve storage system state data from the system state cache 115. Management module 112 can provide the storage system state data to client 105a in response to the request from client 105a. As shown by the illustrated method, the technology can facilitate reducing the number of system polls by satisfying multiple requests with the storage system state data retrieved during a poll instead of initiating a poll for each request. Beneficially, the storage system state data is current for the requests because the state data was collected after the requests were received.

Figure 3:
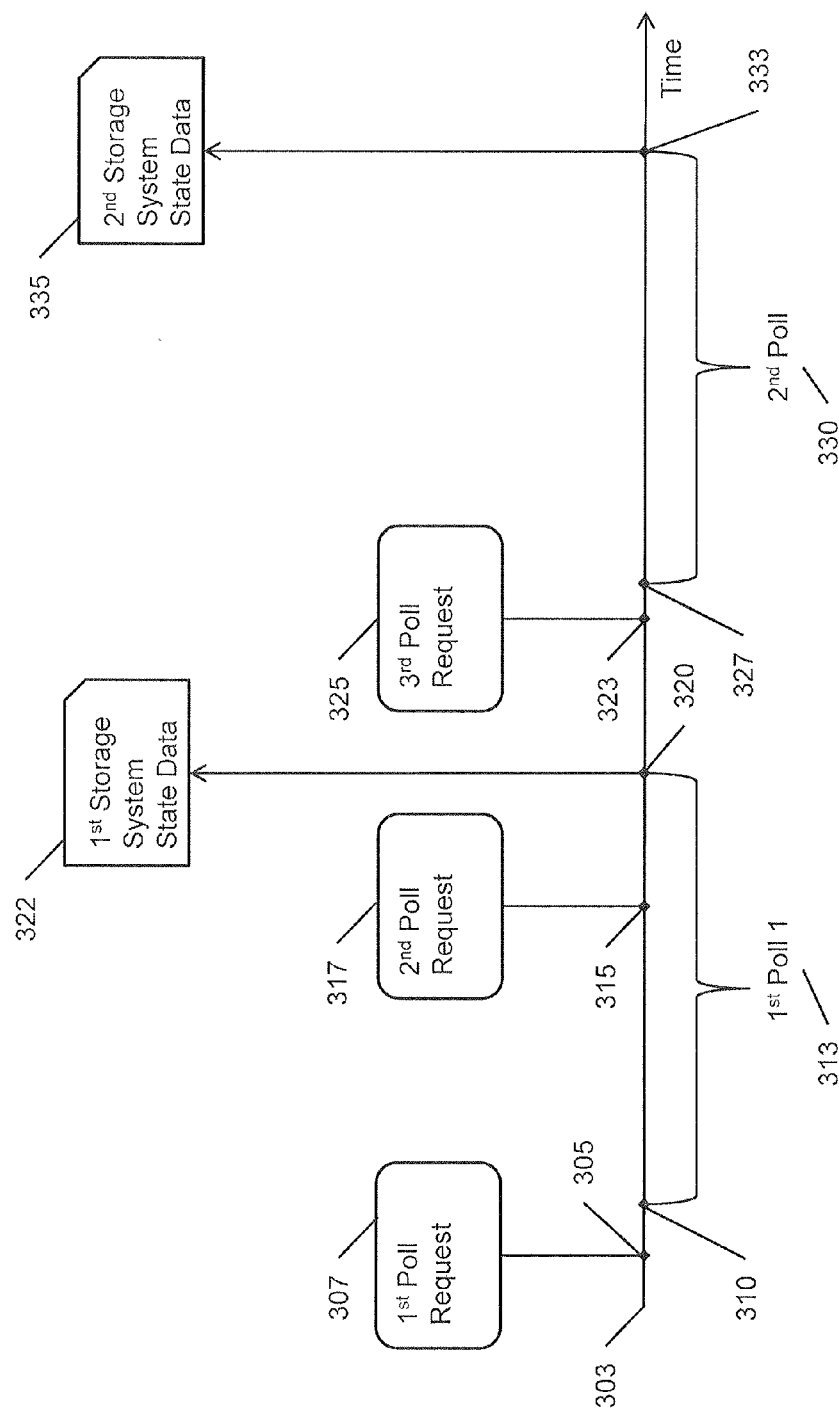
FIG. 3 depicts a timeline illustrating a sequence of events in accordance with the technology.

FIG. 3 depicts timeline 303 illustrating a possible sequence of events in accordance with the technology. In FIG. 3, timeline 303 represents time, increasing in the direction of the arrow of timeline 303. At time 305, first poll request 307 is received (e.g., from client 105a). At time 310, first poll 313 is initiated. At time 315, second poll request 317 is received (e.g., from client 105b). At time 320, first poll 313 completes, returning first storage system state data 322. First storage system state data 322 can be provided in response to first poll request 307 (e.g., to client 105a). In accordance with some embodiments of the technology, first storage system state data 322 is not provided in response to second poll request 317 because second poll request 317 was received (e.g., at time 315) after first poll 313 was initiated (e.g., at time 310).

At time 323, third poll request 325 is received (e.g., from client 105c). At time 327, second poll 330 is initiated. At time 333, second poll 330 completes, returning second storage system state data 335. Second storage system state data 335 can be provided in response to second poll request 317 (e.g., to client 105b). In accordance with some embodiments of the technology, second storage system state data 335 can be provided in response to third poll request 325 (e.g., to client 105c) because second poll 330 was initiated (e.g., at time 327) after third poll request 325 was received (e.g., at time 323).

Figure 4:
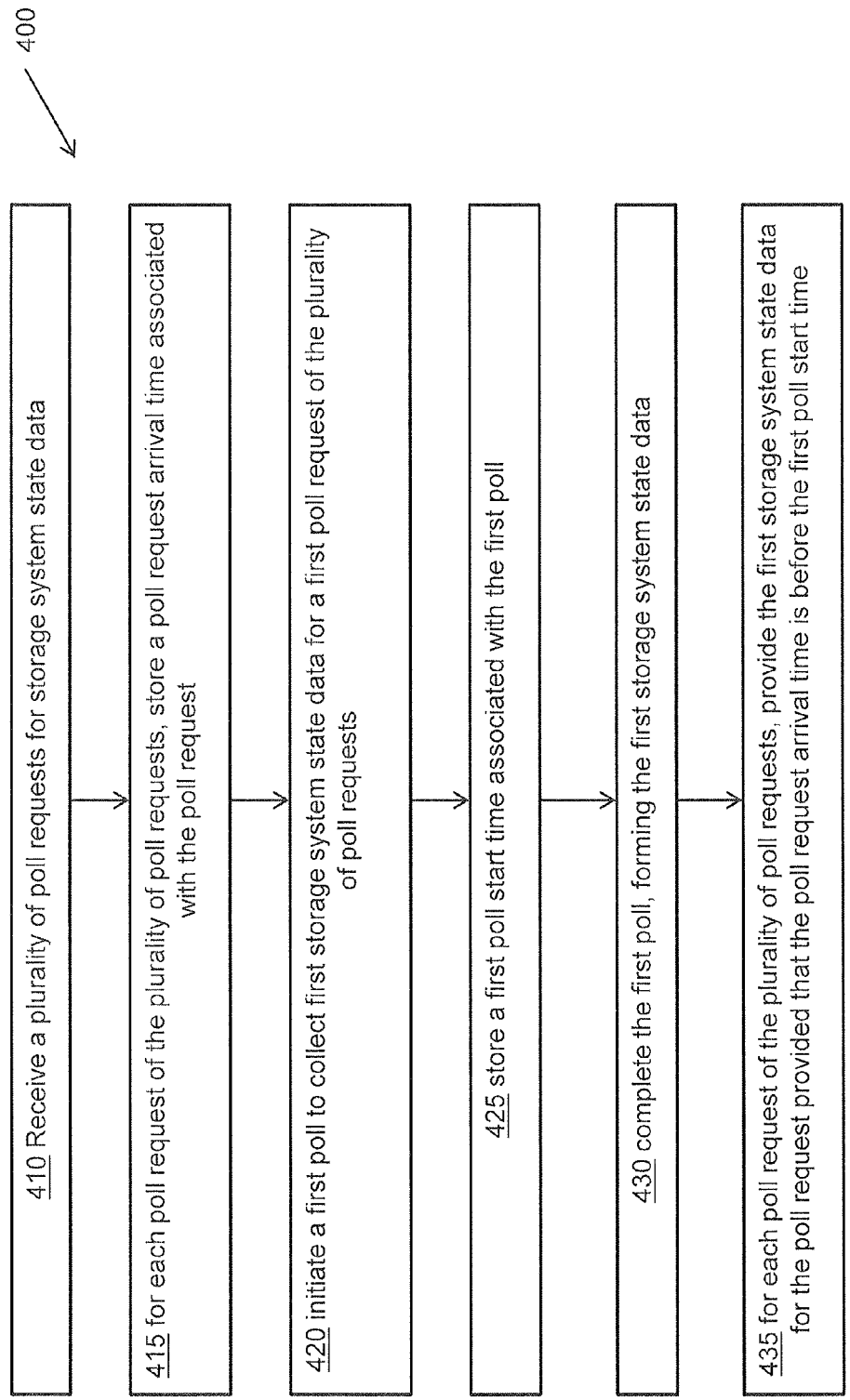
FIG. 4 is a flowchart illustrating a method in accordance with the technology.

FIG. 4 is a flowchart 400 illustrating a method in accordance with the technology. At step 410, a plurality of poll requests for storage system state data are received. At step 415, for each poll request of the plurality of poll requests, a poll request arrival time associated with the poll request is stored. At step 420, a first poll is initiated to collect first storage system state data for a first poll request of the plurality of poll requests. At step 425, a first poll start time associated with the first poll is stored. At step 430, the first poll is completed, forming the first storage system state data. At step 435, for each poll request of the plurality of poll requests, the first storage system state data is provided for the poll request provided that the poll request arrival time is before the first poll start time.

Figure 5A:
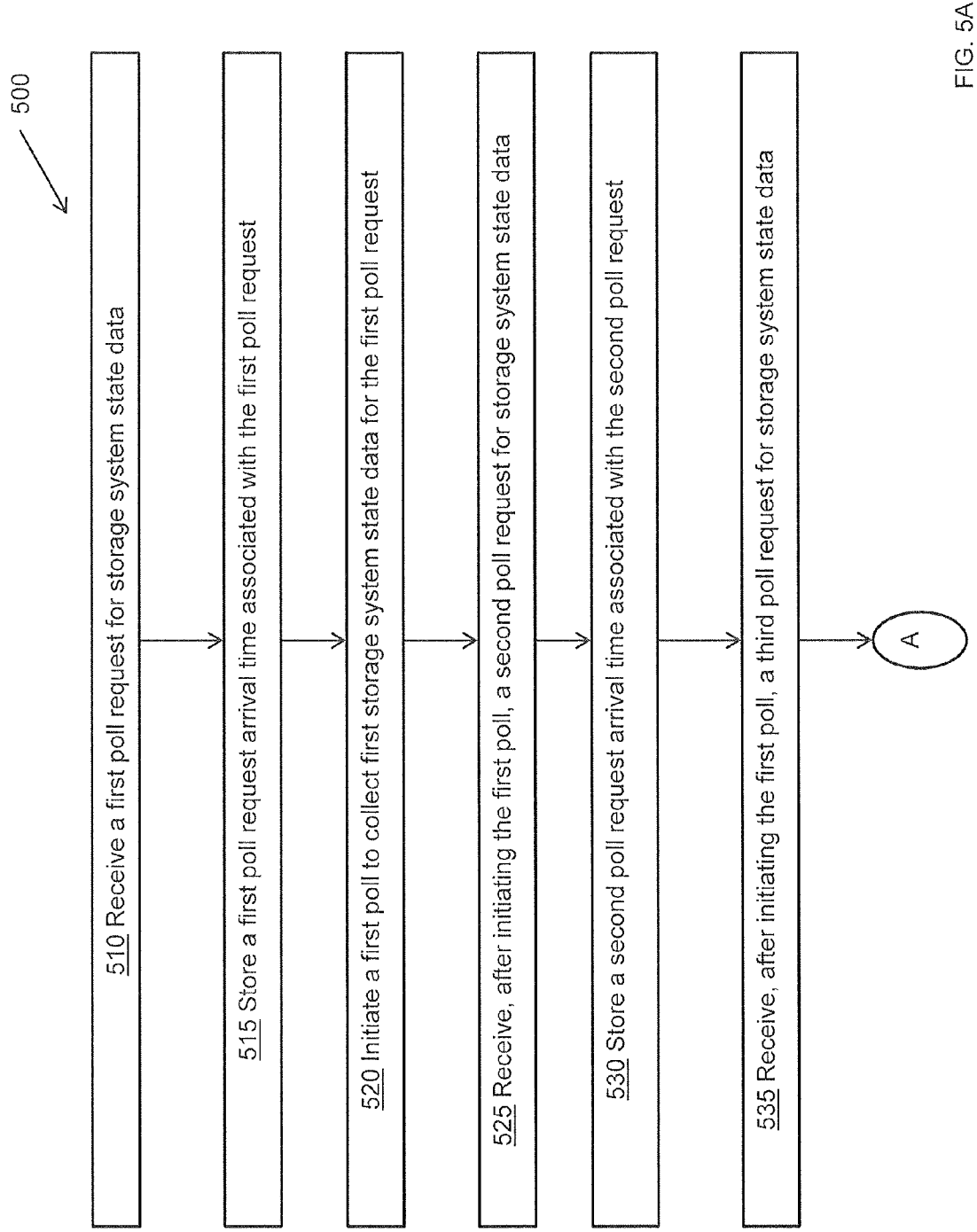

FIGS. 5A and 5B are a flow chart 500 illustrating a method in accordance with the technology. At step 510, a first poll request is received for storage system state data. At step 515, a first poll request arrival time associated with the first poll request is stored. At step 520, a first poll is initiated to collect first storage system state data for the first poll request. At step 525, after initiating the first poll, a second poll request for storage system state data is received. At step 530, a second poll request arrival time associated with the second poll request is stored. At step 535, after initiating the first poll, a third poll request for storage system state data is received. At step 540, a third poll request arrival time associated with the third poll request is stored. At step 545, the first poll is completed, forming the first storage system state data. At step 550, the first storage system state data is provided in response to the first poll request. At step 555, a second poll is initiated to collect second storage system state data for the second poll request. At step 560, the second poll is completed, forming the second storage system state data. At step 565, the second storage system state data is provided in response to the second poll request. At step 570, the second storage system state data is provided in response to the third poll request if the third poll request arrival time is before the initiation of the second poll.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/ or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method performed by a storage system comprising:
   receiving, by the storage system, a plurality of poll requests for storage system state data;
   for each poll request of the plurality of poll requests, storing, by the storage system, a poll request arrival time associated with the poll request;
   initiating, by the storage system, a first poll to collect first storage system state data for a first poll request of the plurality of poll requests;
   storing, by the storage system, a first poll start time associated with the first poll;
   completing, by the storage system, the first poll, forming the first storage system state data; and
   for each poll request of the plurality of poll requests, providing, by the storage system, the first storage system state data for the poll request provided that the poll request arrival time is before the first poll start time.

2. The method of claim 1, wherein the first storage system data comprises at least one of storage system status, storage system name, storage system model, storage system IP address, storage system serial number, storage system storage capacity, storage pool capacity, storage pool and utilization, RAID group capacity, RAID group utilization, LUN status, a number of disks in the storage system, hosts connected to the storage system, mirroring configuration, and replication configuration.

3. The method of claim 1, further comprising receiving, by the storage system, from a client device, a first poll request of the plurality of the poll requests via a network.

4. The method of claim 1, further comprising storing the first storage system state data in a cache of the storage system.

5. The method of claim 4, wherein providing, by the storage system, the first storage system state data for the poll request provided that the poll request arrival time is before the first poll start time comprises providing the first storage system state data from the cache.

6. The method of claim 1, further comprising:
   initiating, by the storage system, a second poll for storage system state data for a second poll request of the plurality of poll requests, wherein the poll request arrival time of the second poll request is after the first poll start time;
   storing, by the storage system, a second poll start time associated with the second poll;
   completing, by the storage system, the second poll, forming second storage system state data; and for each poll request of the plurality of poll requests where the poll request arrival time is after the first poll start time, providing, by the storage system, the second storage system state data for the poll request provided that the poll request arrival time is before the second poll start time.

7. A storage system comprising:
a management module configured to receive a plurality of poll requests for storage system state data;
a poll manager module configured to, for each poll request of the plurality of poll requests, store a poll request arrival time associated with the poll request; initiate a first poll to collect first storage system state data for a first poll request of the plurality of poll requests; and store a first poll start time associated with the first poll;
an administrative module configured to complete the first poll, forming the first storage system state data; and
wherein the poll manager is further configured to, for each poll request of the plurality of poll requests, provide the first storage system state data for the poll request provided that the poll request arrival time is before the first poll start time.

8. The storage system of claim 7, wherein the first storage system data comprises at least one of storage system status, storage system name, storage system model, storage system IP address, storage system serial number, storage system storage capacity, storage pool capacity, storage pool and utilization, RAID group capacity, RAID group utilization, LUN status, a number of disks in the storage system, hosts connected to the storage system, mirroring configuration, and replication configuration.

9. The storage system of claim 7, wherein the management module is further configured to receive, from a client device, a first poll request of the plurality of the poll requests via a network.

10. The storage system of claim 7, wherein the administration module is further configured to store the first storage system state data in a cache of the storage system.

11. The storage system of claim 10, wherein the management module is further configured to provide the first storage system state data from the cache.

12. The storage system of claim 7, wherein the poll manager is further configured to initiate a second poll to collect second storage system state data for a second poll request of the plurality of poll requests, wherein the poll request arrival time of the second poll request is after the first poll start time; and store a second poll start time associated with the second poll;
wherein the administrative module is further configured to complete the second poll, forming second storage system state data; and
wherein the poll manager is further configured to, for each poll request of the plurality of poll requests where the poll request arrival time is after the first poll start time, provide the second storage system state data for the poll request provided that the poll request arrival time is before the second poll start time.

13. A method performed by a storage system comprising:
receiving, by the storage system, a first poll request for storage system state data;
storing, by the storage system, a first poll request arrival time associated with the first poll request;
initiating, by the storage system, a first poll to collect first storage system state data for the first poll request;
receiving, by the storage system, after initiating the first poll, a second poll request for storage system state data;
storing, by the storage system, a second poll request arrival time associated with the second poll request;
receiving, by the storage system, after initiating the first poll, a third poll request for storage system state data;
storing, by the storage system, a third poll request arrival time associated with the third poll request;
completing, by the storage system, the first poll, forming the first storage system state data;
providing, by the storage system, the first storage system state data in response to the first poll request;
initiating, by the storage system, a second poll to collect second storage system state data for the second poll request;
completing, by the storage system, the second poll, forming the second storage system state data;
providing, by the storage system, the second storage system state data in response to the second poll request; and
providing, by the storage system, the second storage system state data in response to the third poll request if the third poll request arrival time is before the initiation of the second poll.

14. The method of claim 13, wherein the first storage system data comprises at least one of storage system status, storage system name, storage system model, storage system IP address, storage system serial number, storage system storage capacity, storage pool capacity, storage pool and utilization, RAID group capacity, RAID group utilization, LUN status, a number of disks in the storage system, hosts connected to the storage system, mirroring configuration, and replication configuration.

15. The method of claim 13, further comprising receiving, by the storage system, from a client device, the first poll request via a network.

16. The method of claim 13, further comprising storing the first storage system state data in a cache of the storage system.

17. The method of claim 13, further comprising:
if the third poll request arrival time is after the initiation of the second poll:
initiating, by the storage system, a third poll to collect third storage system state data for the third poll request;
completing, by the storage system, the third poll, forming the third storage system state data; and
providing, by the storage system, the third storage system state data in response to the third poll request.

* * * * *